No. 872,562. PATENTED DEC. 3, 1907.
J. T. HIBLER.
REVOLVING HARROW.
APPLICATION FILED JULY 19, 1906.
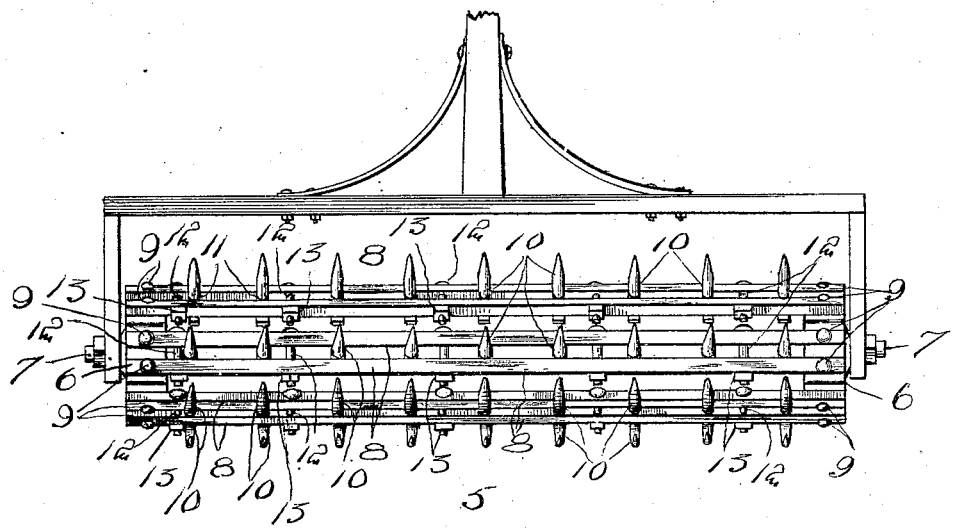
Fig. I
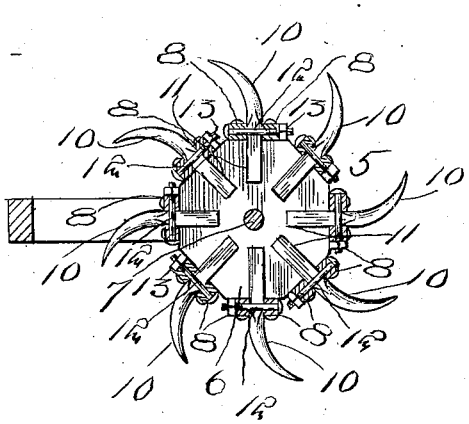
Fig. 2
Witnesses
J. C. Simpson
H. B. MacNab
Inventor
James T. Hibler.
By Chandler Chandler
Attorneys

UNITED STATES PATENT OFFICE.

JAMES T. HIBLER, OF DEL NORTE, COLORADO.

REVOLVING HARROW.

No. 872,562.  Specification of Letters Patent.  Patented Dec. 3, 1907.

Application filed July 19, 1906. Serial No. 326,895.

*To all whom it may concern:*

Be it known that I, JAMES T. HIBLER, a citizen of the United States, residing at Del Norte, in the county of Rio Grande, State of Colorado, have invented certain new and useful Improvements in Revolving Harrows; and I do hereby declare the following to be a full, clear, and exact description of the invention, such as will enable others skilled in the art to which it appertains to make and use the same.

This invention has reference to revolving harrows and comprises the novel construction combination, and arrangement of parts, all as hereinafter fully described, specifically claimed, and illustrated in the accompanying drawings, in which Figure 1 is a plan view of a harrow constructed in accordance with this invention. Fig. 2 is a transverse vertical section taken centrally through Fig. 1.

Like parts are designated by corresponding reference numeral in the several views.

Referring to the drawings the harrow is shown as comprising a drum generally designated 5 and including wheels 6 and a connecting axle 7 which latter extends beyond the wheels at opposite ends as shown. The wheels are preferably polygonal in form and are connected by a series of pairs of steel or other resilient metal strips 8, bolted at opposite ends to the periphery on the wheels, by means of bolts 9.

Mounted between each pair of strips 8 is a series of harrow teeth 10, curved as shown. The stems 11 of said teeth extend between the strips and are frictionally held in place thereby, being adjustable to different depths within the drum. The tension of the strips 8 upon the stems of the harrow teeth is regulated by means of a series of bolts 12 which pass through each pair of strips and project beyond the same at their ends, one end being threaded for the reception of a nut 13. Movement of said nut in one direction or the other will obviously tighten or loosen the members of each pair of strips with reference to each other. As shown in Fig. 1 bolts 12 extend transversely through each pair of strips and are disposed intermediate the ends thereof, the number of bolts being increased or diminished according to the number of teeth in use. The harrow is carried in the usual frame, to the pole of which the draft animals are hitched.

In the operation of the device, the harrow teeth will enter the ground point first, the shape of the teeth being such that they enter the ground at an acute angle thereto, and upon coming up out of the ground, they pass out sidewise so to speak such action loosening the soil and thoroughly cultivating it. In the revolution of the harrow, the teeth enter the soil to their full extent and will thus cut the sod from the surface of the ground to the point of the teeth.

The harrow is particularly adapted for the cultivation of fields sown with alfalfa, where the tendency of the grass known as fox-tail to grow among and choke the alfalfa is well known. The roots of the fox-tail grass spread out close to the surface of the ground thus forming a heavy sod while the alfalfa roots on the contrary grow straight down. In the operation of the harrow, its teeth will thus press into the ground and hook under the grass sod, pulling it up by the roots, loosening the ground thoroughly at the same time and thus insuring a stronger growth of alfalfa.

As above stated the harrow teeth can be inserted to any depth within the drum by merely loosening the engaging strips and in like manner it is possible to readily substitute a new tooth for one that has been broken or has become bent out of shape.

What is claimed is—

A rotary harrow comprising, in combination, a pair of spaced polygonal wheels and a connecting axle; a series of pairs of spaced resilient plane-faced strips secured at opposite ends to the periphery of said wheels, each pair of strips being provided intermediate its ends with a series of pairs of openings formed transversely therethrough; a series of harrow teeth having their stems frictionally engaged with the inner side faces of each pair of strips and adjustable longitudinally and laterally therebetween, to different depths, and to different distances from each other, and a series of bolts engaged in the openings in each pair of strips, to regulate the tension of said strips upon said teeth.

In testimony whereof, I affix my signature, in presence of two witnesses.

JAMES T. HIBLER.

Witnesses:
GEORGE HAIRGROVE,
WM. MONROE.